US008853984B2

(12) United States Patent
Yeh

(10) Patent No.: US 8,853,984 B2
(45) Date of Patent: Oct. 7, 2014

(54) WIRELESS MOTOR CONTROL SYSTEM

(71) Applicant: Chien-Hong Yeh, Taipei (TW)

(72) Inventor: Chien-Hong Yeh, Taipei (TW)

( * ) Notice: Subject to any disclaimer, the term of this patent is extended or adjusted under 35 U.S.C. 154(b) by 198 days.

(21) Appl. No.: 13/646,740

(22) Filed: Oct. 8, 2012

(65) Prior Publication Data

US 2014/0097778 A1 Apr. 10, 2014

(51) Int. Cl.

| | |
|---|---|
| ***H02H 7/08*** | (2006.01) |
| ***H04B 1/00*** | (2006.01) |
| ***G05D 1/02*** | (2006.01) |

(52) U.S. Cl.

USPC ................. 318/434; 701/2; 318/16; 318/581; 455/68

(58) Field of Classification Search

None

See application file for complete search history.

(56) References Cited

U.S. PATENT DOCUMENTS

| | | | | |
|---|---|---|---|---|
| 5,648,892 | A * | 7/1997 | Wieloch et al. | 361/788 |
| 5,907,475 | A * | 5/1999 | Babinski et al. | 361/719 |
| 5,930,112 | A * | 7/1999 | Babinski et al. | 361/695 |
| 7,573,221 | B2 * | 8/2009 | Rock | 318/466 |
| 2013/0063259 | A1 * | 3/2013 | Kramer et al. | 340/539.11 |

* cited by examiner

*Primary Examiner* — Eduardo Colon Santana
*Assistant Examiner* — Devon Joseph
(74) *Attorney, Agent, or Firm* — Leong C. Lei

(57) ABSTRACT

A wireless motor control system includes a connection device and a remote control device. The connection device has a pair of motor connection terminals and a pair of power connection terminals for connecting a motor and an electric power source. The connection device contains a second control circuit board having a processing element, and the processing element has a digital identity for interconnecting the connection device with a control element of the remote control device to form a unique signal transmission channel, and a Zigbee transmission method complied with IEEE 802.15.4 standard forms a group control network. With a relay and a current detector installed in the connection device, the power of the motor is disconnected immediately when there is an over-current.

6 Claims, 5 Drawing Sheets

WIRELESS MOTOR CONTROL SYSTEM

BACKGROUND OF THE INVENTION

1. Field of the Invention

The present invention relates to the technical field of motor control, and in particular a control system capable of controlling the operation of a motor via a wireless remote control and providing the mechanism to protect the control system and preventing interferences between the wireless systems.

2. Description of the Related Art

To facilitate the control of the devices such as a portable hoist, a truck tarp cover, or a winch and to prevent operators of the devices from being too close to danger, a controller is used to control the operation of the motor from a safe distance through wireless remote control. In general, a radio frequency signal is used as the form of transmission, however, the bandwidth of the industrial digital channel is limited that signals from the transmitters may be transmitted to other devices or equipments such as winches or other hardware with the similar frequencies can cause unwanted interferences. Not only the control range is limited to a short distance, but also the accuracy is relatively low, which may cause accidents or danger to users.

In addition, the aforementioned devices including the portable hoist, truck tarp cover or winch that the motor may produce over-current and causes damages to the device. It is an important and urgent issue to protect the motor from over-current.

To overcome the aforementioned problem, the inventor of the present invention designed a wireless control system capable of carrying a large current and using a fixed channel for the connection to prevent interfering with other wireless devices.

SUMMARY OF THE INVENTION

The primary objective of the present invention to provide a wireless remote control system, wherein a connection device coupled to a motor includes a processing element of a digital identity and a remote control device to by the use of the IEEE 802.15.4 Zigbee transmission method, and to perform the corresponding operation by issuing an instruction signal to the connection device from the wireless transmission channel. Since every digital identity is unique, the wireless transmission channel connected by the remote control device is also a unique one. The present invention uses the IEEE 802.15.4 Zigbee specification to form a group network system, so that the remote control device can effectively prevent interferences with other wireless devices or issuing instructions to other devices.

Another objective of the present invention is to provide a wireless motor control system, wherein a connection device coupled to a motor includes a current detector and a relay installed therein, so as to effectively control the current of the motor. If the current surge of the motor is higher than a safe limit, the relay will be disconnected the power immediately to prevent the motor or the devices or object driven by the motor from damage and the connection device of the present invention can bear a very large current.

To achieve the foregoing objective, the present invention provides a wireless motor control system, and the wireless motor control system is provided for a user to control the operation of a motor by the IEEE 802.15.4 Zigbee transmission method, comprising: at least one connection device, having a pair of motor connection terminals, a pair of power connection terminals and a first switch, and the pair of motor connection terminals and the pair of power connection terminals being provided for the connection device to connect the motor and an electric power source respectively, and the first switch being provided for controlling an operation status of the connection device, and the connection device containing: a first control circuit board, electrically coupled to the pair of power connection terminals; a relay, installed on the first control circuit board, and electrically coupled to the pair of motor connection terminals, for controlling a switch status of the motor; a current detector, installed on the first control circuit board, and electrically coupled to the pair of motor connection terminals and the relay for detecting the current of the motor, and automatically stopping the power supply to the motor to stop the operation of the motor if a surge of the motor is too large; and a second control circuit board, installed at the top inside the connection device, and coupled to the first control circuit board through a flat cable, and the second circuit board having a processing element for receiving and transmitting a wireless signal transmitted from the user, and the processing element having a digital identity; a remote control device, having a plurality of function keys disposed on an external side of the remote control device and a control element installed in the remote control device, so that the user can connect the control element to the processing element to form a wireless transmission channel by matching the corresponding digital identity by the function keys, and transmit a signal to the connection device through the wireless transmission channel, and the processing element receives the signal to control a corresponding operation of the motor.

Wherein, the connection device has a second switch installed thereon for controlling a forward or reverse rotation status of the motor, and the first switch and the second switch are dual in-line package (DIP) switches respectively.

In a preferred embodiment, the pair of motor connection terminals and the pair of power connection terminals have a safety device installed separately thereon to avoid connecting the positive and negative electrodes in a reverse order or burning the device due to the over-voltage of the electric power source.

In addition, the remote control device has a cover, and after the cover is lifted, the remote control device is turned on automatically, and after the cover is closed, the remote control device is turned off automatically. The remote control device has at least one warning light and at least one channel indicating light for respectively reminding the user about a low power level of the remote control device, and light up the channel indicating light when the user selects the wireless transmission channel through the function keys.

DETAILED DESCRIPTION OF THE PREFERRED EMBODIMENTS

The technical contents of the present invention will become apparent with the detailed description of preferred embodiments and the illustration of related drawings as follows.

Figure 1:
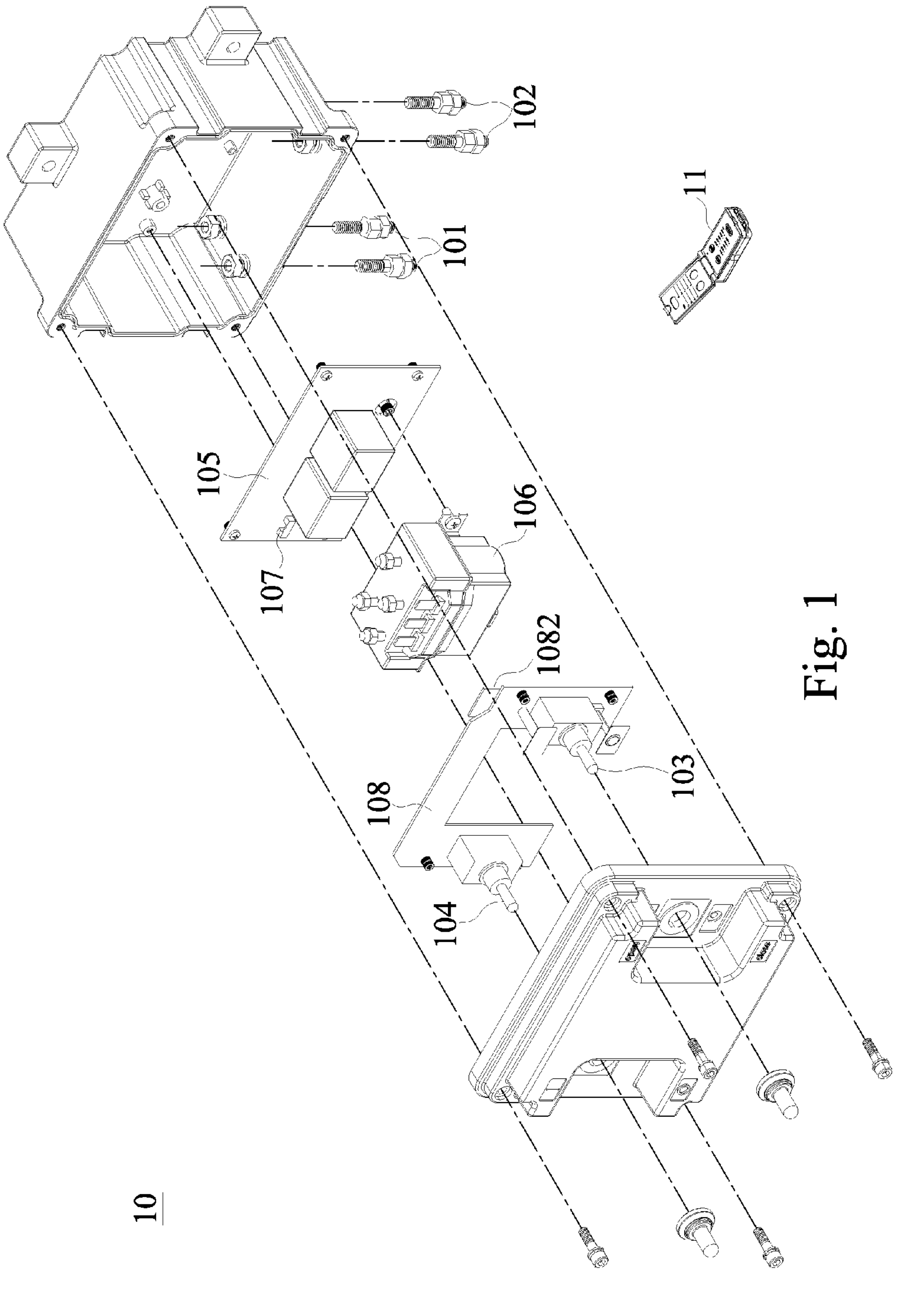
FIG. 1 is an exploded view of a connection device in accordance with a preferred embodiment of the present invention.
Figure 2:
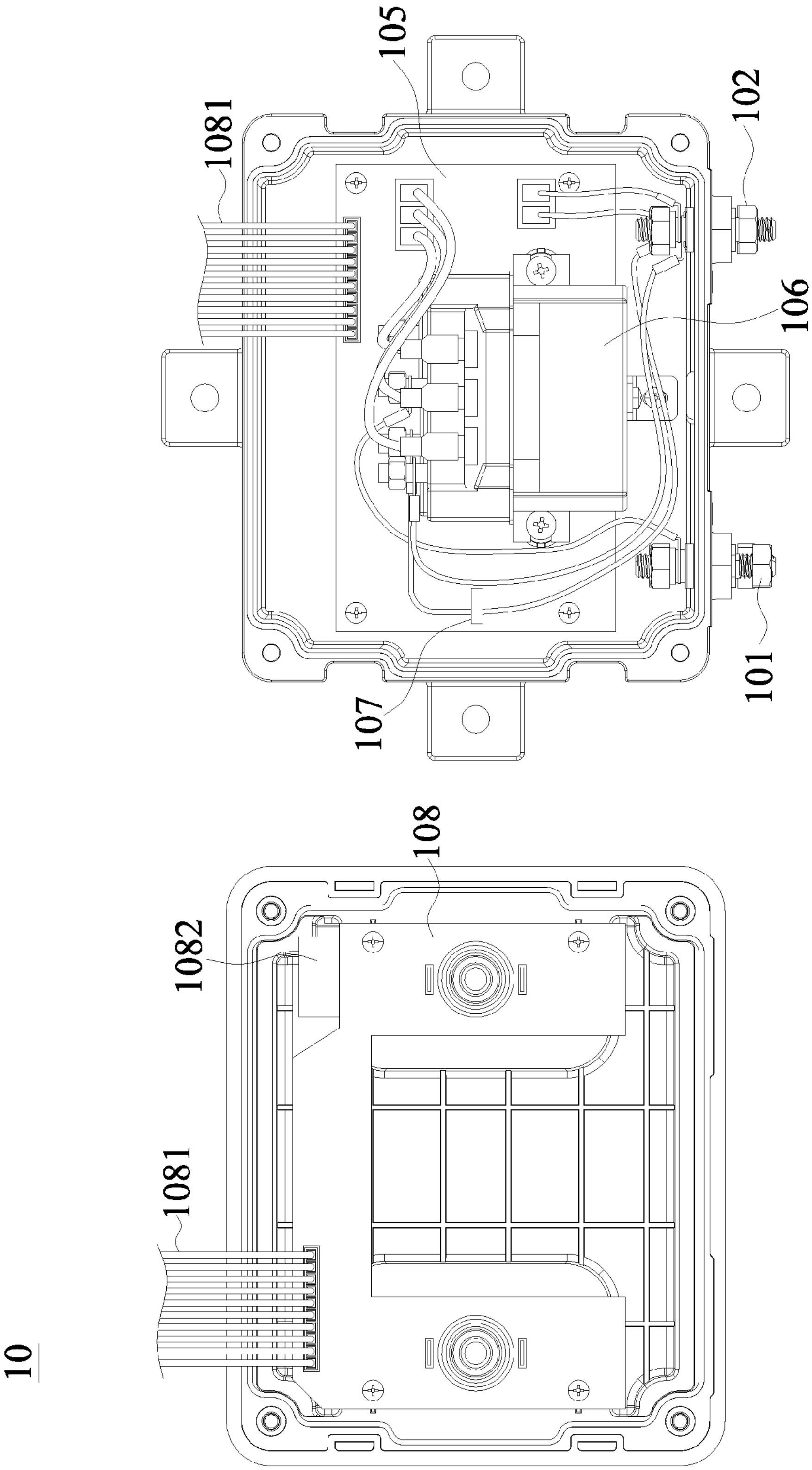
FIG. 2 is a schematic circuit diagram of a connection device in accordance with a preferred embodiment of the present invention.
Figure 3:
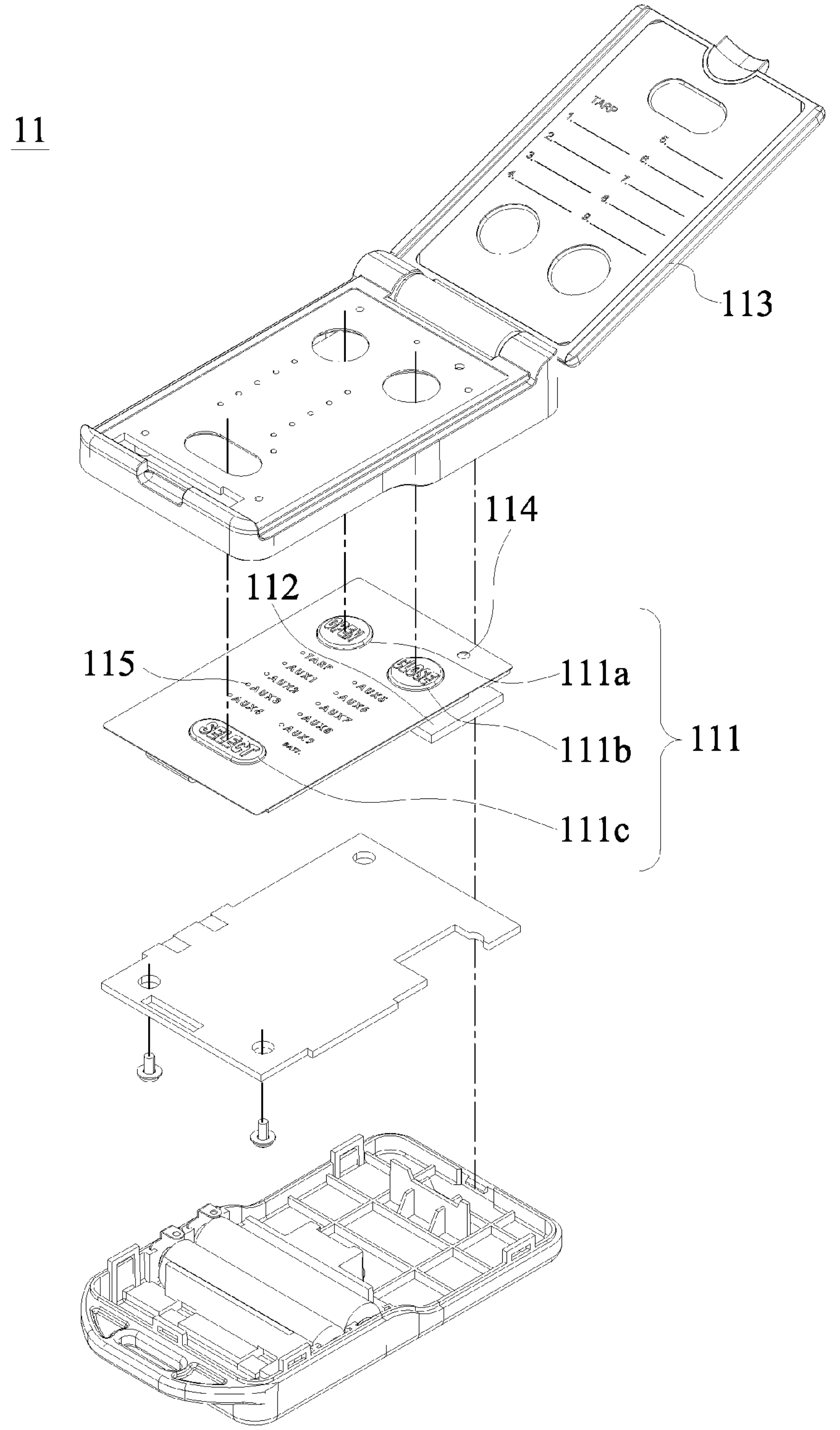
FIG. 3 is an exploded view of a remote control device in accordance with a preferred embodiment of the present invention.
Figure 4:
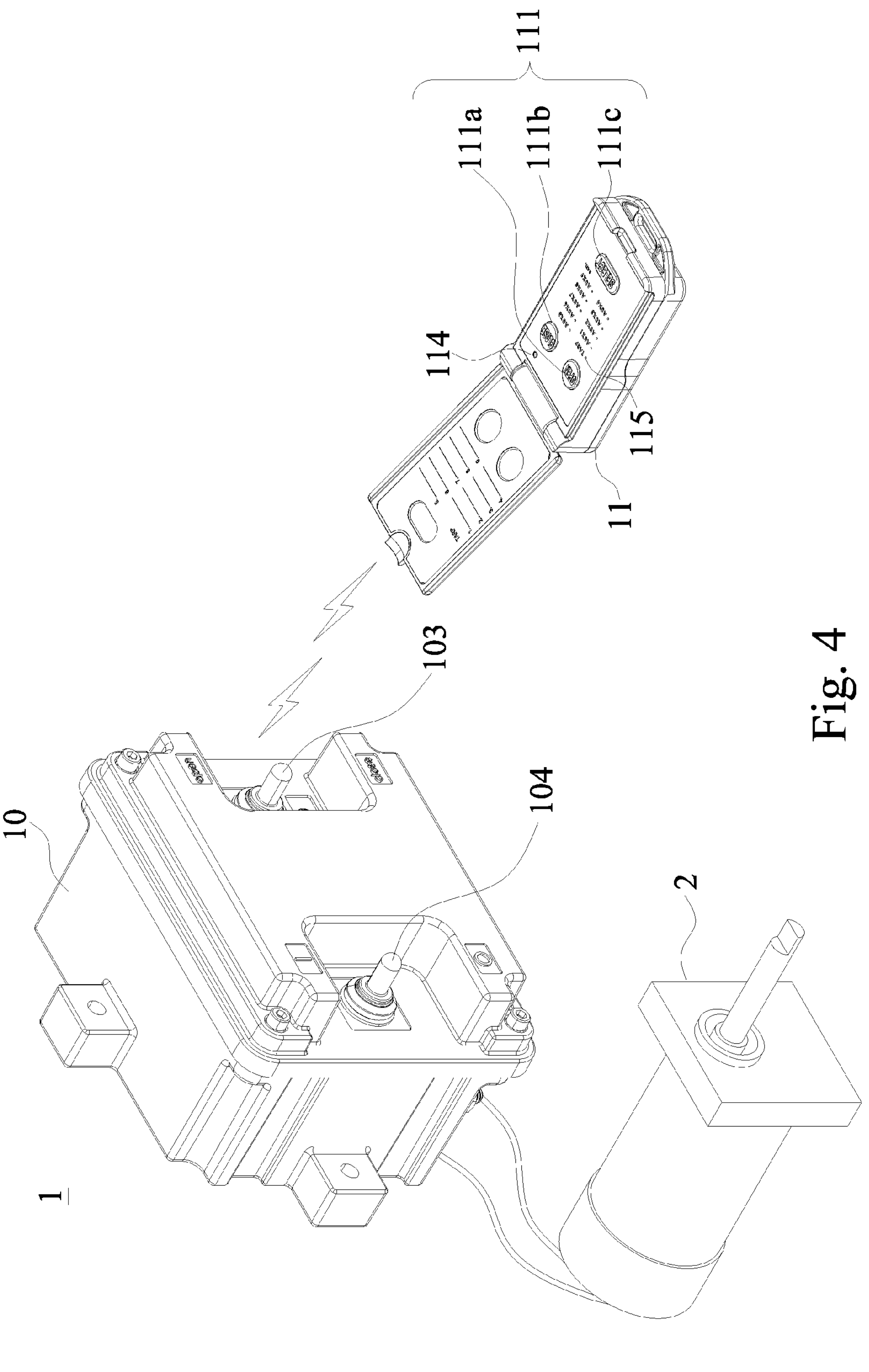
FIG. 4 is a perspective view of a preferred embodiment of the present invention.
Figure 5:
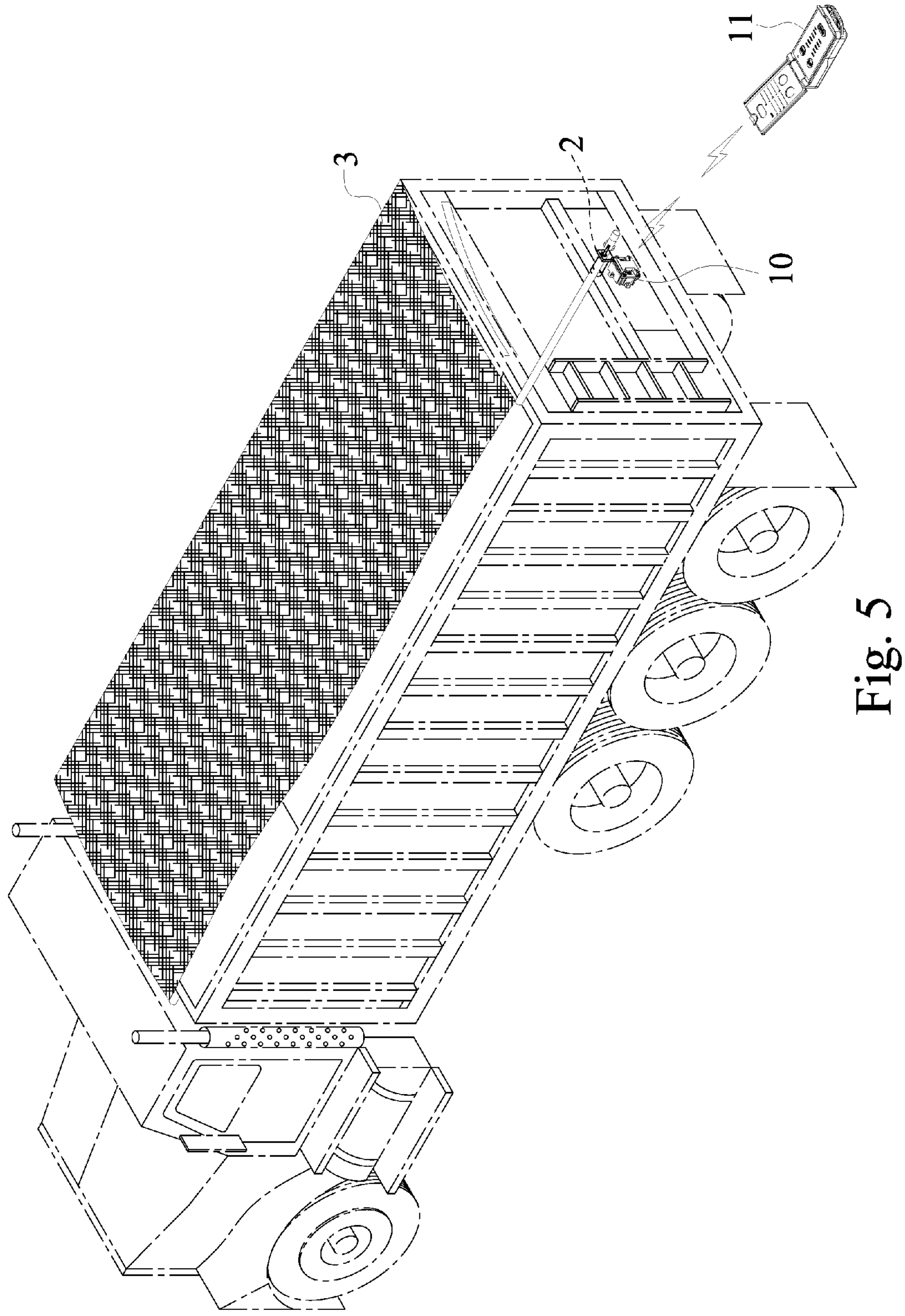
FIG. 5 is a schematic view of an application of a preferred embodiment of the present invention.

With reference to FIGS. 1 to 5 for an exploded view of a connection device, a schematic circuit diagram of the connection device, an exploded view of a remote control device, a perspective view, and a schematic view of an application in accordance with a preferred embodiment of the present invention respectively, a wireless motor control system 1 of the present invention comprises at least one connection device 10 and a remote control device 11.

The wireless motor control system 1 is provided for a user to control the operation of a motor 2 through a wireless transmission method complied with the IEEE 802.15.4 Zigbee transmission method, wherein the motor 2 is installed at a machinery equipment such as a portable hoist or a winch, or used for opening or closing a large object such as an electric truck trap cover.

The connection device 10 has a pair of motor connection terminals 101, a pair of power connection terminals 102 and a first switch 103, and the pair of motor connection terminals 101 and the pair of power connection terminals 102 are provided for the connection device 10 to connect the motor 2 and an electric power source (not labeled in the figure), wherein a safety protection is set at the pair of power connection terminals 102 to avoid connecting the positive and negative electrodes of the electric power source in a reverse order or supplying too much power to burn the device. Preferably, the electric power source coupled to the connection device 10 has a voltage ranging from 8V to 8V, and the connection device 10 can bear a maximum surge of 220A. However, this is only a preferred range, and the present invention is not limited to such range only. The first switch 103 is provided for controlling the operation status of the connection device 10, wherein the connection device 10 further includes a second switch 104 for controlling the forward and reverse rotation statuses of the motor 2, and the first switch 103 and the second switch 104 are dual in-line package (DIP) switches. The connection device 10 includes a first control circuit board 105, a relay 106, a current detector 107 and a second control circuit board 108 installed therein.

The first control circuit board 105 is installed inside the connection device 10 and electrically coupled to the pair of power connection terminals 102, and the relay 106 and the current detector 107 are installed onto the first control circuit board 105 according to a circuit layout.

The relay 106 is installed on the first control circuit board 105 and electrically coupled to the pair of motor connection terminals 101 and the relay 106 to serve as an automatic safety switch for controlling the operating status of the motor 2 and stopping the operation of the motor 2 by disconnecting the power if necessary.

The current detector 107 is also installed on the first control circuit board 105 and electrically coupled to the pair of motor connection terminals 101 and the relay 106 to detect the current of the motor 2. If there is a too-large surge of the motor 2, the relay 106 will be disconnected automatically to form an open circuit and stop supplying power to the motor 2, so as to stop the operation of the motor 2 and prevent the continual operation of the installed machines, tools or objects which may damage the motor 2.

The second control circuit board 108 is installed at an internal top of the connection device 10 and coupled to the first control circuit board 105 through a flat cable 1081, and the second control circuit board 108 has a processing element 1082, and the processing element 1082 has a digital identity and is matched with the remote control device 11 through the IEEE 802.15.4 Zigbee transmission method for receiving and transmitting a signal from the remote control device 11.

The remote control device 11 has a plurality of function keys 111 disposed on an external side of the remote control device 11 and a control element 112 installed in the remote control device 11. In this preferred embodiment, the function keys 111 include an ON button 111*a*, an OFF button 111*b* and a SELECT button 111*c*, and the control element 112 has the digital identity recorded therein, and the user can match a corresponding digital identity through the SELECT button 111*c*. After the processing element 1082 and the control element 112 are connected through the IEEE 802.15.4 Zigbee transmission method to form a wireless transmission channel, the remote control device 11 transmits related operation instructions to the connection device 10 through the ON button 111*a* and the OFF button 111*b*, and the signal is transmitted to the connection device 10 by the wireless transmission channel and received and processed by the processing element 1082 to control a corresponding operation of the motor 2.

It is noteworthy that the signals are transmitted between the remote control device 11 and the connection device 10 by the IEEE 802.15.4 Zigbee transmission method. Compared with the conventional RF or IR transmission, the IEEE 802.15.4 Zigbee transmission method supports network transmission of a large volume and forms a group individual network featuring short delay, power-saving, long transmission distance and safe encryption. Since the digital identity is an independent unique identification code, therefore the wireless transmission channel produced by matching the remote control device 11 is also independent and unique and will not be interfered by wireless transmissions of other electronic devices, and the connection device 10 is only connected to receive the signal issued from the control element 112 of the corresponding digital identity, and such design provides a complete grouping of the present invention to avoid mutual interferences.

The remote control device 11 includes a cover 113, at least one warning light 114 and at least one channel indicating light 115. The cover 113 is coupled to the remote control device 11. After the cover 113 is lifted, the remote control device 11 is turned on automatically. After the cover 113 is closed, the remote control device 11 is turned off automatically. If the cover 113 is not covered and the remote control device 11 has been idled for more than a predetermined time, the operation of the remote control device 11 will stop automatically.

The warning light 114 is provided for reminding the user about a low power level of the remote control device 11 or used as an indicating light showing the match status of the remote control device 11 and the connection device 10. In this preferred embodiment, there are plural warning lights 114.

If the user selects the wireless transmission channel through the SELECT button 111*c*, the corresponding channel indicating light 115 will be lit to inform the user about currently selected wireless transmission channel. In this preferred embodiment, there are plural channel indicating lights 115.

The remote control device 11 can record a plurality of digital identities of the connection device 10 through the control element 112, so that the SELECT button 111*c* can be used to select different digital identities and the wireless transmission channel connected to the control element 112, so as to control different connection devices 10. In other words, the remote control device 11 can be used for controlling a plurality of connection devices 10 and their connected motors 2 at the same time.

The present invention can be applied in a wide range of applications such as a truck tarp cover 3, a portable hoist, and a winch. During the use, the connection device 10 and the remote control device 11 are turned on. Now, the remote control device 11 searches each connection device 10 with the corresponding digital identity stored in the control element 112 and connects to the connection device 10 selected by the user to form the corresponding wireless transmission channel. Now, the user can control the operation of the motor 2 through the ON button 111*a* and the OFF button 111*b* to drive the machinery tool installed with the motor 2, so as to drive the tarp cover 3. For example, the user can press the ON button 111*a* to transmit an ON signal to the connection device 10 through the IEEE 802.15.4 Zigbee transmission method, so that the motor 2 is operated to drive the tarp cover 3. If the user releases the ON button 111*a* now, the motor 2 will be stopped immediately, so that the moving distance of the tarp cover 3 can be specified according to the user's requirement. In the other hand, if the user presses the OFF button 111*b* for a long time, then the OFF signal will be sent to the connection device 10, and the motor 2 will be operated to move the tarp cover 3 in a reverse direction. However, if the user has not noticed that the tarp cover 3 has moved to its maximum distance, the motor 2 has moved the tarp cover 3 to its top position or bottom position to produce a very large surge current. Since the current detector 107 keeps detecting the current of the motor 2, therefore the relay 106 will be disconnected automatically to stop the power supply of the motor 2, so as to achieve the effects of preventing the motor 2 from being damaged by the over-current, extending the service life of the motor 2, and protecting the safety of the user.

The wireless motor control system 1 of the present invention can be controlled by the remote control device 11 at a remote end to operate the control system installed at a machinery tool such as a winch or a portable hoist or used to control a motor 2 of a large object such as the tarp cover 3. The connection device 10 is coupled to the motor 2 and the independent and unique digital identity is used to match and connected the remote control device 11 through the IEEE 802.15.4 Zigbee transmission method to form a wireless transmission channel of the corresponding digital identity, and the user issues an instruction to the connection device 10 through the wireless transmission channel to control the corresponding operation of the motor 2. Since the control element 112 has recorded a plurality of digital identities, the user can select different wireless transmission channels by a simple setting through the SELECT button 111*c* to control different connection devices 10 or can connect the connection device 10 with different matched remote control devices 11 for the control and operation, so as to achieve the grouping effect. In addition, the connection device 10 has the relay 106 and the current detector 107 for detecting the current of the motor 2 anytime, and stopping the operation of the motor 2 immediately if a large surge of the motor 2 is produced, so as to avoid damages. The connection device 10 of the present invention can bear a current of approximately 220A which is much greater than the current bearable by the conventional safety control device.

While the invention has been described by means of specific embodiments, numerous modifications and variations could be made thereto by those skilled in the art without departing from the scope and spirit of the invention set forth in the claims.

In summation of the description above, the present invention improves over the prior art and complies with patent application requirements, and thus is duly filed for patent application.

What is claimed is:

1. A wireless motor control system, provided for a user to control the operation of a motor by the IEEE 802.15.4 Zigbee transmission method, comprising:

at least one connection device, having a pair of motor connection terminals, a pair of power connection terminals and a first switch, and the pair of motor connection terminals and the pair of power connection terminals being provided for the connection device to connect the motor and an electric power source respectively, and the first switch being provided for controlling an operation status of the connection device, and the connection device containing:

a first control circuit board, electrically coupled to the pair of power connection terminals;

a relay, installed on the first control circuit board, and electrically coupled to the pair of motor connection terminals, for controlling a switch status of the motor;

a current detector, installed on the first control circuit board, and electrically coupled to the pair of motor connection terminals and the relay for detecting the current of the motor, and automatically stopping the power supply to the motor to stop the operation of the motor if a surge of the motor is too large; and a second control circuit board, installed at the top inside the connection device, and coupled to the first control circuit board through a flat cable, and the second circuit board having a processing element for receiving and transmitting a wireless signal transmitted from the user, and the processing element having a digital identity;

a remote control device, having a plurality of function keys disposed on an external side of the remote control device and a control element installed in the remote control device, so that the user can connect the control element to the processing element to form a wireless transmission channel by matching the corresponding digital identity by the function keys, and transmit a signal to the connection device through the wireless transmission channel, and the processing element receives the signal to control a corresponding operation of the motor.

2. The wireless motor control system of claim 1, wherein the connection device has a second switch installed thereon for controlling a forward or reverse rotation status of the motor.

3. The wireless motor control system of claim 2, wherein the first switch and the second switch are DIP switches respectively.

4. The wireless motor control system of claim 1, wherein the remote control device has a cover, and after the cover is lifted, the remote control device is turned on automatically, and after the cover is closed, the remote control device is turned off automatically.

5. The wireless motor control system of claim 1, wherein the remote control device has at least one warning light for reminding the user about a low power level of the remote control device.

6. The wireless motor control system of claim 1, wherein the remote control device has at least one channel indicating light, and the corresponding channel indicating light is lit when the user selects the wireless transmission channel through the function keys.

* * * * *